United States Patent [19]
Kano et al.

[11] Patent Number: 4,957,195
[45] Date of Patent: Sep. 18, 1990

[54] HYDRAULIC DEVICE FOR AN AUTOMATIC TRANSMISSION

[75] Inventors: Takenori Kano, Anjo; Haruki Takemoto, Chiryu; Mamoru Niimi, Handa; Isao Takase, Aichi; Fumitomo Yokoyama, Anjo, all of Japan

[73] Assignee: Aisin AW Co., Ltd., Aichi, Japan

[21] Appl. No.: 293,394

[22] Filed: Jan. 4, 1989

[30] Foreign Application Priority Data

Sep. 27, 1988 [JP] Japan .................. 63-242878

[51] Int. Cl.[5] .................. F16D 25/10
[52] U.S. Cl. .................. 192/106 F; 192/87.1
[58] Field of Search .................. 192/106 F, 87.14, 87.1

[56] References Cited

U.S. PATENT DOCUMENTS 4,573,560  3/1986  Eguchi .................. 192/87.1
4,732,253  3/1988  Hiramatsu et al. .................. 192/106 F

FOREIGN PATENT DOCUMENTS

0141343  6/1987  Japan .................. 192/87.1

Primary Examiner—Leslie A. Braun
Assistant Examiner—Andrea Pitts
Attorney, Agent, or Firm—Kanesaka and Takeuchi

[57] ABSTRACT

A centrifugal hydraulic pressure cancel chamber is arranged at the back of a second piston member of a second hydraulic actuator for the second clutch. A first piston member of a first hydraulic actuator for a first clutch is situated behind the second piston. A centrifugal hydraulic pressure cancel plate is set at an inner periphery on a rotating member to prohibit axial movement and set at an outside periphery in a inside of the piston member oil-tightly. The inside surface of the second piston member and the cancel plate compose the centrifugal hydraulic pressure cancel chamber. A spring is placed between the second piston member and the cancel plate, and the centrifugal hydraulic cancel chamber and the spring work correspondingly to the first and the second piston members.

7 Claims, 5 Drawing Sheets

|      | C1 | C2 | C0 | C3 | B1  | B2 | B3  | F1 | F2 | F0 |
|------|----|----|----|----|-----|----|-----|----|----|----|
| 1ST  | O  |    |    |    |     |    | (O) |    | O  |    |
| 2ND  | O  |    |    |    | (O) | O  |     | O  | △  |    |
| 3RD  | ✴  |    | O  | O  |     | O  |     | △  | ″  | O  |
| 4TH  |    |    | O  | O  | O   | O  |     | ″  | ″  | △  |
| REV  |    | O  |    |    |     |    | O   |    |    |    |

REMARKS: O  ENGAGING
(O) ENGAGING WHEN ENGINE BRAKE APPLIED
✴ RELEASED BEFORE F0 BEING ENGAGED
△ OVER RUNNING

HYDRAULIC DEVICE FOR AN AUTOMATIC TRANSMISSION

BACKGROUND OF THE INVENTION

1. FIELD OF THE INVENTION

The present invention relates to an automatic transmission to be mounted on an automobile especially to an automatic transmission having a forward four speed automatic transmission mechanism. In detail, it relates to a hydraulic device used when a hydraulic actuator to operate a clutch is drained.

2. DESCRIPTION OF THE RELATED ART

The applicant of the present invention has proposed an automatic transmission having an automatic transmission mechanism of forward three or four speeds composed of a planetary gear unit made up of the combination of a single planetary gear and a dual planetary gear. The invention by the above applicant is thought out to use the common parts and the assembly process between the mechanism of forward three speeds and that of four speeds in order not to raise so much production cost. And this automatic transmission is thought out to answer for the wide variation for the vehicle types.

The applicant of the present invention has proposed an automatic transmission mechanism, wherein a fourth clutch (C3) is placed to work with a one-way clutch which operates at the third and the fourth speed modes to prevent mechanical locking to the reverse direction. (refer to the Japanese application, No. Sho-62-094868).

Figure 5:
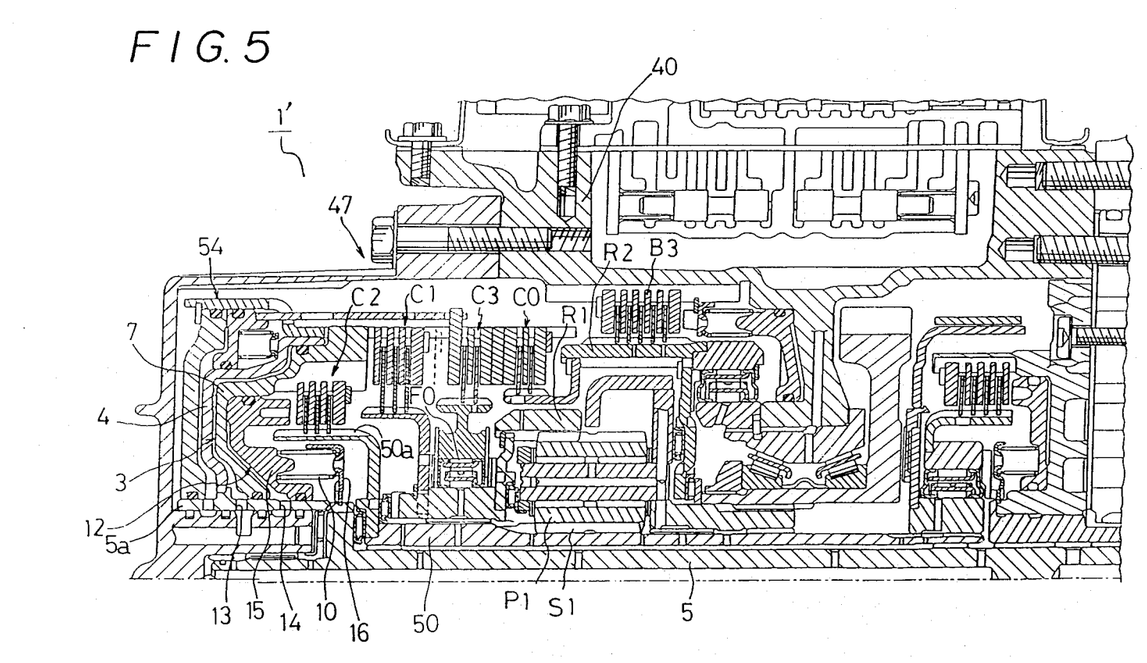
FIG. 5 is a cross sectional view of the automatic transmission mechanism which the applicant of the present invention has proposed.

In the automatic transmission mechanism 1', as shown in FIG. 5, a one-way clutch OF operating in the transmission from the fourth speed mode to the third speed mode, clutches C1 and C2 connected to rotating elements R1 and R2 respectively, a third clutch CO, a fourth clutch C3, hydraulic actuators 3, 12 and 54 for controlling above clutches are all housed in a clutch section 47 which is placed in a rear portion of the mechanism 1' Further, in the clutch section 47, a first (forward) clutch C1 is placed between a spline arranged on the inside surface of the peripheral section of a clutch drum 4 and a spline arranged on the axially elongated section of a ring gear R1. A second (reverse) clutch C2 is placed between a spline arranged on the inside surface of a peripheral section of a movable member 7 and a spline arranged on the outer surface of a hub 50a fixed on the hollow shaft. The movable member 7 is enclosed by a clutch drum 4 through a spline to permit an axial movement and the movable member 7 encloses a piston member 15. The movable member 7 and a cylinder made up by the inside surface of the clutch drum 4 constitute an oil chamber, which is a hydraulic actuator 3 for the first clutch C1. The piston member 15 and a cylinder made up by the inside surface of the movable member 7 constitute an oil chamber, which is a hydraulic actuator 12 for the second clutch C2. Between the piston member 15 and the receiving member 16 fixed on a sleeve 5a by a snap ring, a spring 10 is arranged. The spring 10 composes a return spring used for both the piston members 7 and 15 of hydraulic actuators 3 and 12.

When engaging and operating the first (forward) clutch C1, the movable member 7 is moved inside the clutch drum 4 by the hydraulic pressure taken out from the oil hole 13 arranged in the sleeve 5a. When engaging and operating the second clutch C2, the piston member 15 is moved by the hydraulic pressure taken out from the oil hole 14 arranged in the sleeve 5a. And when releasing the first clutch C1, the piston member 15 and the movable member 7 are moved to the side of the clutch drum 4 by the return spring 10 and are operated to contract by draining the hydraulic actuator 3.

In the automatic transmission mechanism 1' which has been proposed by the applicant of the present invention the first (forward) clutch C1 is engaged up to the third speed mode and the clutch C1 is released when shifting up to the fourth speed mode. The clutch C1 must be released quickly by draining the hydraulic actuator 3 speedily at the high speed rotation to shift to the fourth speed mode. At this state, the actuator 3 rotates at a high speed with the input shaft and the centrifugal hydraulic pressure is working strongly, so it is difficult to drain the oil smoothly. In order to drain the centrifugal hydraulic pressure, it is possible to arrange many check balls in the movable member 7, however, by this structure slip time is made longer because certain time is needed for increase of the hydraulic pressure when the hydraulic pressure is supplied at a high speed rotation. Furthermore, if the hydraulic pressure raise cannot overcome the centrifugal force working on many balls, the connection of the clutch C1 is not done easily because of the difficulty of the hydraulic pressure raise.

SUMMARY OF THE INVENTION

The present invention is purposed to provide a hydraulic device solving the problems mentioned above. In this invention a centrifugal hydraulic pressure cancel chamber is adjoined to a hydraulic pressure actuator for a second clutch C2. Based on the rotation of the chamber and the actuator for the first and the second clutches C1, C2, the centrifugal hydraulic pressure which works on the first and the second actuators is counterbalanced.

Figure 1:
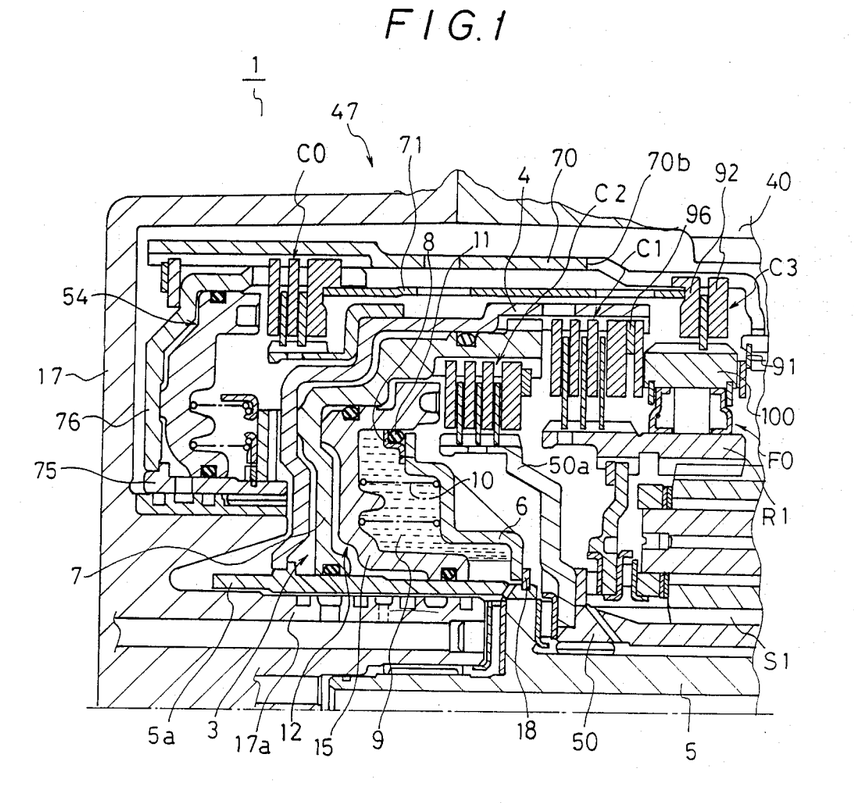
FIG. 1 is a cross sectional view of the main part of the hydraulic device for an automatic transmission related to the present invention.

The present invention, taking the above mentioned situation into consideration, provides the hydraulic device for an automatic transmission, for example, as shown in FIG. 1, having hydraulic actuators (3), (12) formed by an inside surface of a cylinder member (4) coupled to a rotating member (5) and piston members (7), (15) enclosed in the cylinder member (4) with to permit axial movement so that the actuators (3), (12) operate to engage certain clutches as required to connect the rotating member (5) to other rotating member (a carrier CR1, for example); a centrifugal hydraulic pressure cancel plate (6) which is situated in the back side of the piston member (15) without axial movement and contacts to the piston member (15) sealingly manner so that the back side of the piston member (15) and the cancel plate (6) form a hydraulic chamber (9) to cancel centrifugal hydraulic pressure.

It is possible to arrange the automatic transmission such that a first hydraulic actuator (3) constituted by a clutch drum member (4) situated concentrically with the rotating member (5) and a first piston member (7) enclosed in the inside surface of the clutch drum member (4) and a second hydraulic actuator (12) constituted by the inside surface of the first piston member (7) and a second piston member (15) enclosed in the first piston member (7) are provided so that the first and the second hydraulic actuators (3), (12) operate the certain clutches (C1), (C2) to connect to other rotating members, and the centrifugal hydraulic pressure cancel plate (6) is situated in the back side of the second piston member (15).

Furthermore a spring (10) is compressedly situated between the back side of the piston member (15) and the centrifugal hydraulic pressure cancel plate (6).

As an example, the clutch which is engaged by the operation of the first hydraulic actuator is a first clutch (C1) which is kept engaged from a first speed mode to a direct connecting driving mode and which is released when an over-drive running mode.

Based on the above structure, for example, in the case of shifting up when a vehicle is running at a certain speed with the clutch (C1) being engaged by the operation of the hydraulic actuator (3) for the first clutch (C1), the hydraulic actuator (3) is drained and the clutch (C1) is released. At this state, the centrifugal hydraulic pressure is working on the actuator (3), however, as this centrifugal hydraulic pressure is counter-balanced by the centrifugal hydraulic pressure in the centrifugal hydraulic pressure cancel chamber (9) which rotates together with the actuator (3), the actuator (3) quickly contracts by the return spring (10) and releases the clutch (C1) instantly.

In case that the clutch engaged by the operation of the first hydraulic actuator (3) is the first clutch (C1) which is connected from the first speed mode to the direct connecting driving mode and which is released at the over-drive mode, for example, at D range, when up shifting from the third speed mode to the fourth speed mode is conducted under the condition that the first clutch (C1) is engaged by the operation of the hydraulic actuator (3), the big centrifugal hydraulic pressure due to high speed rotation is counter-balanced by the centrifugal hydraulic pressure in the centrifugal hydraulic cancel oil chamber (9). So the actuator (3) can contract instantly by the return spring (10) without getting any influence from the big centrifugal hydraulic pressure, and the first clutch (C1) is released quickly.

Incidentally, the reference numerals in the prentheses are used only for reference with the drawings and do not define the invention. The same number may be named differently in the following description and in the previous description in which broader concepts are adopted.

DETAILED DESCRIPTION OF THE PREFERRED EMBODIMENTS

An explanation of the embodiment shall be shown along with Figures.

Figure 3:
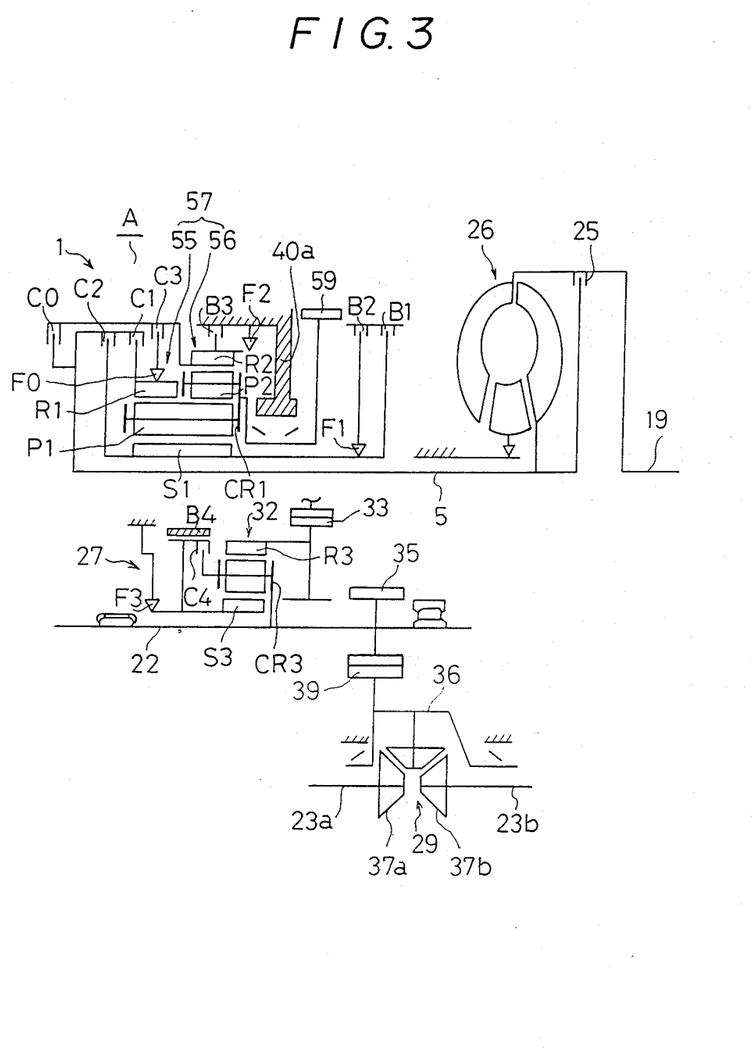
FIG. 3 is a schematic illustration of the automatic transmission.

An explanation for an automatic transmission A applying the present invention shall now be shown along with FIG. 3. The automatic transmission A has three shafts; an input shaft 5 lined on an engine crank shaft 19, a counter shaft 22 and a front axle shaft formed of shafts 23a, 23b. On the input shaft 5, a torque converter 26 having a lock-up clutch 25 and a forward four speed automatic transmission mechanism 1 are supported, on the counter shaft 22, an under drive mechanism 27 is supported, and on the front axle shafts 23a, 23b a front differential device 29 is supported.

The four speed automatic transmission mechanism 1 has a planetary gear unit 57 composed of a single planetary gear 55 and a dual planetary gear 56. In the planetary gear unit 57, sun gears of the two planetary gears are integrally linked to form a common sun gear S1, and carriers are integrally linked to form a common carrier CR1. A pinion engaging with a sun gear S1 is composed of a long pinion Pl. The input shaft 5 and a ring gear R1 (a small ring gear) of the single planetary gear 55 are connected through a first (forward) clutch C1. The input shaft 5 and sun gear S1 are connected through a second (reverse) clutch C2. The sun gear S1 is restrained directly by a first brake B1 and is restrained in one-way rotation by a second brake B2 through a first one-way clutch F1. A ring gear R2 (a big ring gear) of the dual planetary gear 56 is restrained directly by a third brake B3 and is restrained in one-way rotation by a second one-way clutch F2. The carrier CR1 is connected to a counter drive gear 59 supported by a case supporting wall and this gear 59 is an output member for the four speed automatic transmission mechanism 1.

The clutches C1, C2, the brake B1,B2, and the one-way clutches F1,F2 are arranged here in the four speed automatic transmission mechanism 1 as in the same position as the three speed automatic transmission mechanism, however, besides the above structure, a third clutch CO connecting the input shaft 5 and the big ring gear R2, a fourth clutch C3 and a third one-way clutch FO are provided between the big ring gear R2 and the small ring gear R1.

The under drive mechanism 27 has a single planetary gear 32, whose carrier CR3 and a sun gear S3 are connected through a fifth (direct) clutch C4. The sun gear S3 is restrained directly by a fourth (under drive) brake B4 and is restrained at one-way clutch F3. A ring gear R3 is connected to a counter driven gear 33 which is an input member of an under drive mechanism 27, and engages with the counter drive gear 59. The carrier CR3 is connected to the counter shaft 22 on which a reduction gear 35 which is the output member of the under drive mechanism 27 is fixed.

The front differential device 29 has a differential carrier 36 and left and right side gears 37a, 37b. A ring gear 39 is fixed on the differential carrier 36 which is a gear mount case. The ring gear 39 engages with the reduction gear 35 to compose a final reduction mechanism, where left and right side gears 37a and 37b are connected to the left and right front axle shafts 23a and 23b, respectively.

Figure 4:
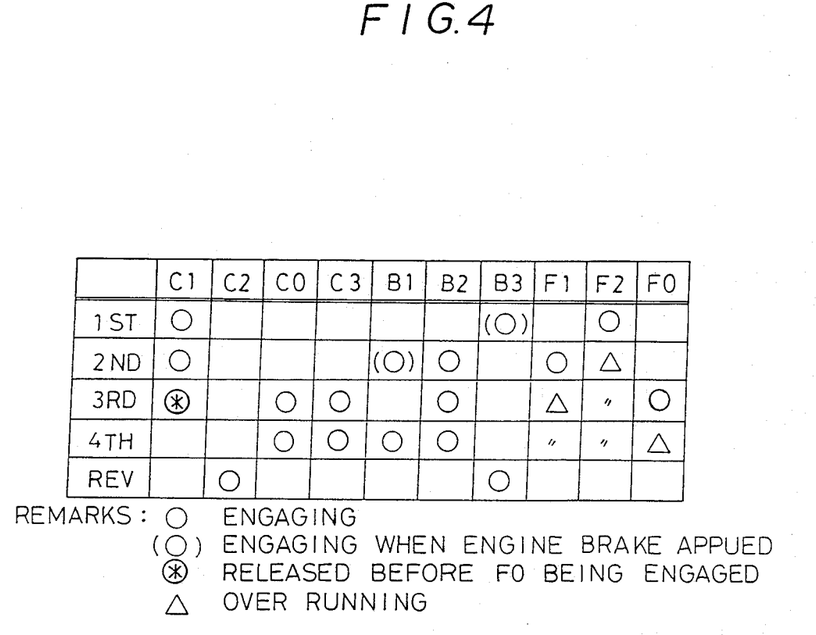
FIG. 4 is a table of operation of the automatic transmission.

Furthermore, the operation of the four speed automatic transmission mechanism 1 shall be explained along with FIG. 4. The rotation of the engine crank 19 is transmitted to the input shaft 5 through the torque convertor 26 or the lock-up clutch 25. And at the first speed mode of D range, the first clutch C1 is engaged. At this stage, the rotation of the input shaft 5 is transmitted to the small ring gear R1 through the first clutch C1, and the rotation of the big ring gear R2 is stopped by the second one-way clutch F2, so that by idling the sun gear S1 reversely, the rotation of the carrier CR1 is reduced considerably in the normal rotative direction. And this rotation is taken out from the counter drive gear 59.

At the second speed mode of D range, not only the first clutch C1 engages but also the second brake B2 is engaged. Then the rotation of the sun gear S1 is restrained by the operation of the first one-way clutch F1 based on the brake B2. So by the rotation from the input shaft 5 to the small ring gear R1, the big ring gear R2 idles in the positive direction, and the carrier CR1 reduces its rotation speed in the normal rotating direction. This reduced rotation is taken out from the counter drive gear 59 as the second speed. By the above operation when the speed mode is changed from the first to the second, the shift shock caused by the gear changes does not happen and shifting is done smoothly.

At the third speed mode of D range, the third clutch C0 and the fourth clutch C3 are engaged in addition to the second speed mode. Then the rotation is transmitted from the input shaft 5 to the small ring gear R1 through the first clutch C1, and then transmitted to the big ring gear R2 through the third clutch C0. By this operation the planetary gear unit 57 rotates together and the direct rotation is transmitted to the counter drive gear 59.

When the speed mode is changed from the second to the third, the first one-way clutch F1 is changed from the locked mode to the over-run mode so that the shift shock caused by the gear change does not happen and shifting is done smoothly. At the third speed mode, the third clutch C0 and the fourth clutch C3 are engaged at the same time, and the rotation of the input shaft 5 is transmitted to the small ring gear R1 even by the transmission path running through the third clutch C0, the fourth clutch C3 and the third one-way clutch F0.

At the up-shift at D range from the third speed to the fourth, the first clutch C1 is released at first. At this stage, the rotation is transmitted to the small ring gear R1 mainly by the transmission path through the third clutch C0, the fourth clutch C3 and the third one-way clutch F0. At this state, the first brake B1 operates. Then the sun gear S1 is stopped even to the reverse rotation, so that the rotation of the big ring gear R2 transmitted from the input shaft 5 through the third clutch C0, which over runs the one-way clutch Fo and idles the small ring gear R1 at high speed, is taken out from the carrier CR1 as the over drive rotation. In this process, the first clutch C1 is released, and shifting is conducted under the control of the operation of the third one-way clutch Fo, so that the shift shock caused by the gear changes does not occur and shifting is done smoothly.

Furthermore, when the engine brake is applied such as at the 3 range, the 2 range and the 1 range, the third brake B3 operates to stop the big ring gear R2 even to the reverse rotation at the first speed mode and the first brake B1 operates to stop the sun gear S1 even to the reverse rotation, at the second speed mode.

At the reverse range, the second clutch C2 connects and the third brake B3 operates. At this stage, the rotation of the input shaft 5 is transmitted to the sun gear S1 through the second clutch C2. The big ring gear R2 is stopped by the third brake B3 so that the carrier CR1 rotates reversely by rotating the small ring gear R1 reversely by rotating the small ring gear R1 reversely, and the reverse rotation of this carrier CR1 is taken out to the counter drive gear 59.

At the under drive mechanism 27, the rotation from the counter driven gear 33 is taken out from the ring gear R3 to the carrier CR3 as a reduced (under drive) rotation, when the sun gear S3 is stopped by the fourth brake B4 and (or) the fourth one-way clutch F3. And if the fourth brake B4 is released and the fifth clutch C4 is engaged, the carrier CR3 and the sun gear S3 work together so that the direct rotation is taken out from the counter shaft 22.

And at the automatic transmission A, the forward four speed of the four speed automatic transmission mechanism 1 and the reduced speed and the direct speed of the under drive mechanism 27 are combined at a required time, so that a required transmission stage can be made and this rotation is transmitted to the front differential device 29 through the reduction gear 35 and the ring gear 39, and also transmitted to left and right axle shafts 23a, 23b.

The types of combination for the four speed automatic transmission mechanism 1 and the under drive mechanism 27 are to be shown: for example, a mode switching means is provided to operate such that the under drive mechanism 27 under reduced speed condition and the four speed automatic transmission mechanism 1 are combined as power-mode, or the under drive mechanism 27 under direct drive condition and the automatic transmission mechanism 1 are combined as economy-mode; a special operation means is provided so that the under drive mechanism 27 operates under extra-low mode or extra-high mode; a forward five speed automatic transmission is made up by operating the under drive mechanism 27 between the second and the third speed of the four speed automatic transmission 1.

Figure 2:
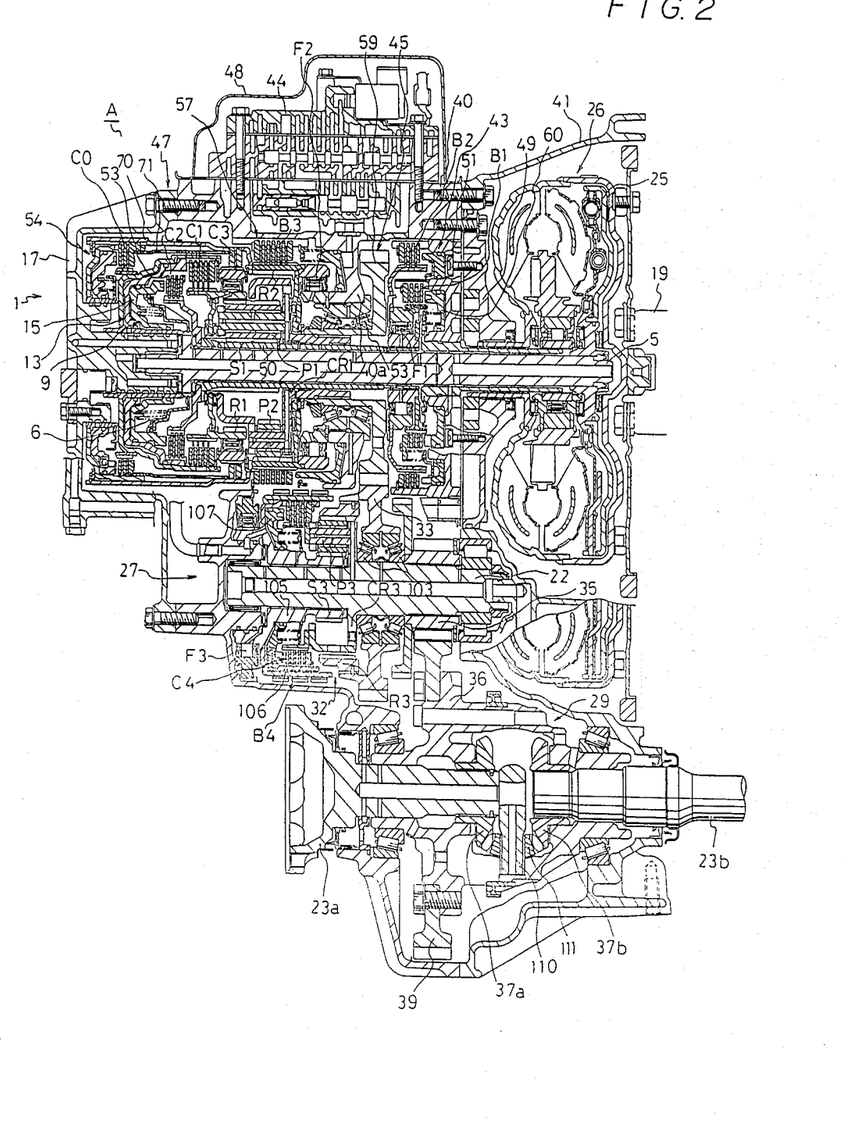
FIG. 2 is a total cross sectional view of the automatic transmission.

An explanation which materialize the above automatic transmission A is shown along with FIG. 2.

The automatic transmission device A has an integral case composed of a transaxle case 40, a transaxle housing 41 and a rear cover 17. The input shaft 5, the counter shaft 22 and a ring gear mount case 36 which is a differential carrier of a front differential device 29 are housed and rotationally supported. On the input shaft 5, a torque converter 26 having the lock-up clutch 25, and the four speeds automatic transmission mechanism 1 are arranged, and on the counter shaft 22, a second under drive mechanism 27 is arranged. And in the transaxle case 40, a valve body 44 covered with a side cover 48 is arranged.

In the four speed automatic transmission mechanism 1, a brake section 43, an output section 45, a planetary gear unit 57 and a clutch section 47 are arranged in order from the engine crank shaft 19 to the back way of along the shaft. Between the brake section 43 and the torque converter 26, an oil pump 49 is rotationally arranged and a hollow shaft 50 encloses and is supported on the input shaft 50.

The planetary gear unit 57 is composed of the single planetary gear 55 and the dual planetary gear 56 (refer to FIG. 3) The single planetary gear 55 is composed of the sun gear S1 composed of the hollow shaft 50, the ring gear R1 and the carrier CR1 supporting the pinion P1 engaging the sun gear S1 and the ring gear R1. The dual planetary gear 56 is composed of the sun gear S1, the ring gear R2 and the carrier CR1 which supports the first pinion P1 meshing with the sun gear S1 and the second pinion P2 meshing with the ring gear R2 so that both pinions P1 and P2 mesh with each other. And both of these planetary gears 55, 56 are composed of a mono gear of the same number of teeth, which is made on the hollow shaft 50. The carrier CR is composed integrally and the pinion P1 is made up by a long pinion.

Furthermore, in the brake section 43, a one-way clutch F1, a first brake B1 composed of a multiple plate and a second brake B2 composed of the multiple plate are arranged in order from the inside to the outside. The first one-way clutch F1 has its inner race engaged with the edge of the hollow shaft 50 and its outer race fixed to a hub for the second brake. On the front (engine) side of the inner race of the one-way clutch F1, a hub for the first brake is fixed. At the back side of an oil pump cover of the oil pump 49, a hydraulic actuator 60 for the first brake and a hydraulic actuator 51 for the second brake are arranged radially outwardly from the inside.

The output section 45 has a counter drive gear 59 placed in the middle of the four speed automatic transmission mechanism 1. This counter drive gear 59 is free rotationally supported through a double tapered bearing 53 by a supporting wall 40a arranged in the axle case 40 and has a boss of the counter gear 59 connected to the carrier CR1 of the planetary gear unit 57. Furthermore, the outer race of the bearing 53 is spline coupled to the inside surface of the case supporting wall 40a. And on the elongated outer surface of the outer race, the second one-way clutch F2 is arranged. Between the ring gear R2 and the axle case 40 a third brake B3 is arranged.

As shown in detail in FIG. 1, a clutch section 47 has a first (forward) clutch and a second (reverse) clutch and is arranged in the transaxle rear cover 17 placed on behind the four speed automatic transmission mechanism 1. The back edge of the input shaft 5 is to be the sleeve 5a and encloses a center boss 17a of the rear cover 17. A clutch drum 4 is connected to this sleeve 5a. Furthermore, this clutch drum 4 encloses a movable member 7 by a spline to permit axial movement. And the movable member 7 encloses a piston member 15. The movable member 7 and a cylinder made up from the inside of the clutch drum 4 constitute an oil chamber, which is a hydraulic actuator 3 for the first clutch C1. The piston member 15 and a cylinder made up by the inside of the movable member 7 constitute an oil chamber, which is a hydraulic actuator 12 for the second clutch C2.

Furthermore, between the piston member 15 and the hub 50a fixed on the hollow shaft 50 a centrifugal hydraulic pressure cancel plate 6 as a receiving member supporting the piston return spring is arranged. This cancel plate 6 is composed as stair shape and has many steps. The inside edge of the cancel plate 6 is enclosed in a sleeve 5a to prohibit axial movement by a snap ring 18. A plate 8 is welded to the outside edge of the centrifugal hydraulic pressure cancel plate 6 by such as electronic beam. The inside surface of the piston member 15 and the back side of the cancel plate 6 compose a centrifugal hydraulic pressure cancel chamber 9. This oil chamber 9 can store oil scattered by the rotation of the input shaft 5. This oil generates the centrifugal hydraulic pressure at the rotation of the oil chamber 9. Furthermore, between the cancel plate 6 and the piston member 15 a spring 10 is arranged, which composes a return spring to be used for both the piston member 15 and the movable member 7.

The piston member 15 composes the hydraulic actuator 12 for the second clutch C2 by composing an oil chamber in association with the cylinder formed of the inside surface of the movable member 7. The first clutch C1 is placed between the spline arranged on the inside surface of the outer diameter of the clutch drum 4 and a spline formed on an axial extension of the ring gear R1. The second clutch C2 is placed between the spline arranged on the inside surface of the outer diameter of the movable member 7 and the spline arranged on the outer surface of the hub 50a which is fixed by the hollow shaft 50.

This four speed automatic transmission 1 has following devices besides the above three speed transmission mechanism and the common members. A sleeve member 75 encloses a circular boss of the rear cover 17. A flange member 76 is fixed on this sleeve member 75 to compose a cylinder of a hydraulic actuator 54 for the third clutch C0. On the edge part of the drum member 70 arranged at the out side of the flange member 76 of the hydraulic actuator 54, a groove 70b, where a separator plate 92 is engaged, is arranged. And a tube 71 which composes the output members is held, parallel to the inside surface of the drum member 70 between the separator plate for the third clutch Co and the separator plate 92 for the fourth clutch C3. And an outer race 100 for the third one-way clutch FO is arranged between the snap ring 96 for unscrewing the first clutch C1 and the snap ring 91 for connecting the drum members.

The under drive mechanism 27, as shown in the FIG. 2, has one single planetary gear 32. Furthermore, a counter driven gear 33 is free rotationally supported on the counter shaft 22 through a bearing 103. A reduction gear 35 is also fixed on the counter shaft 22. A ring gear R3 of the planetary gear 32 is connected to the counter driven gear 33. The carrier CR3 is arranged altogether by bulging the counter shaft 22 radially. Furthermore, the sun gear S3 is arranged on the hub 105 free rotationally supported on the counter shaft 22. The fourth brake B4 made of a hand brake is engaged to the drum 106 which is fixed on the outside surface of the hub. Between the inside surface of the drum 106 and the hub fixed on the carrier CR3 a fifth clutch C4 is arranged. Furthermore, a piston is enclosed in the hub 105 which is next to the clutch C4 and composes the hydraulic actuator 107. And, between the elongated part of the hub 105 and the case 40 the fourth clutch F3 is arranged.

The front differential device 29 has a ring gear mount case 36 to become the deaf carrier. This case 36 is free rotationally supported by the housing 41 and the case 40 through the bearings. Furthermore, on the mount case 36, a big diameter ring gear 39 which engages with the reduction gear 35 is fixed. Inside the mount case 36 a pinion gear 111 is free rotationally supported by the pinion shaft 110 and also left and right side gears 37a, 37b engaging the gear 111 are free rotationally supported. The left and right front axle shafts 23a and 23b are enclosed by and connected to the side gears 37a and 37b, respectively.

The explanation for the above operation example shall now be shown in detail.

At the forward first speed mode, the hydraulic pressure is supplied to the hydraulic actuator 3 through the oil passage arranged in the rear cover 17. Then the movable member 7 moves against the spring 10 by using the clutch drum 4 as a cylinder, which engages the first clutch C1. At this state, the rotation of the input shaft 5 is transmitted to the small ring gear R1 through the clutch drum 4 and the first clutch C1. At the same time when the big ring gear R2 is stopped by the second one-way clutch F2, the first speed rotation is taken out from the carrier CR1. When the engine brake is working, the third brake B3 operates and stops the big ring gear R2 directly. This rotation, as has been explained along with FIG. 3, is transmitted to the under drive mechanism 27 through the counter drive gear 59 and the counter driven gear 33, also to the front differential device 29 through the reduction gear 35 and the ring gear 39 and to the left and right front axle shafts 23a and 23b.

And at the forward second speed mode, the hydraulic pressure is supplied to the hydraulic actuator 51 and operates the second brake B2. Then the sun gear S1 is stopped through the one-way clutch F1 and the hollow shaft 50. The rotation of the small ring gear R1 through the first clutch C1 is taken out from the carrier CR1 as the second speed rotation as explained before. When it is necessary to work the engine brake at the second speed mode, the hydraulic pressure is supplied to the hydraulic actuator 60 and stops the sun gear S1 directly.

At the forward third speed mode, besides the hydraulic supply to the hydraulic actuator 3 for the first clutch C1, the hydraulic pressure is supplied to the hydraulic actuator 54 through the oil passages arranged in the circular boss of the rear cover 17, and the third clutch C0 is engaged. By this process the rotation of the input shaft 5 is transmitted to the big ring gear R2. At the same time with the rotation of the small ring gear R1, the direct rotation rotating the gear unit 57 together is taken out from the carrier CR1.

Furthermore, before the up-shift to the forward fourth speed mode the first clutch C1 is released by draining hydraulic pressure actuator 3. At this state, a high centrifugal hydraulic pressure is working in the actuator 3 by the high speed rotation directly connecting to the input shaft 5, however, as the centrifugal hydraulic pressure is counter-balanced by the centrifugal hydraulic pressure of the oil stored in the centrifugal hydraulic pressure cancel chamber 9 which rotates at a high speed with the actuator 3, the movable member 7 is moved to the side of the clutch drum 4 instantly together with the piston 15 by the spring 10. Therefore, as the hydraulic actuator 3 for the first clutch C1 contracts speedily, the first clutch C1 is released directly without getting any influence from the centrifugal hydraulic pressure at the up-shifting when the centrifugal hydraulic pressure is largely working by the high speed rotation of the hydraulic actuator 3. As the centrifugal hydraulic cancel plate 6 is used as a receiving member to support the thrust force of the return spring 10 as well, new members such as plate members to compose the centrifugal hydraulic cancel chamber 9 need not be formed. Therefore, the structure of the device is not complexed so that the automatic transmission is not made any larger nor elongated to the axial direction.

At condition of this state, the force of the small ring gear R1 is transmitted through the third clutch CO, the fourth clutch C4 and the third one-way clutch FO. At this state, the hydraulic pressure is supplied to the hydraulic actuators 60, 51, and operates the first brake B1. If the sun gear S1 is stopped, the rotation of the input shaft 5 is transmitted to the big ring gear R2 through the third clutch CO and the drum member 70. This rotation idles the small ring gear R1 at high rotative speed and over-runs the one-way clutch FO so that the over-drive rotation is taken out from the carrier CR1.

At reverse range state, the hydraulic pressure is supplied to the hydraulic actuator 12 through the oil passage 17c arranged in the rear cover 17 to move the piston member 15, which uses the movable member 7 as a cylinder, against the spring 10 to engage the second clutch C2 and the third brake B3 is engaged. At this state, the rotation of the input shaft 5 is transmitted to the sun gear S1 through the clutch drum 4, the movable member 7, the second clutch C2 and so on. Since the big ring gear R2 is stopped based on the third brake B3, the reverse rotation is taken out from the carrier CR1.

TECHNICAL ADVANTAGES OF THE INVENTIONS

As has been explained till now on, in this invention the centrifugal hydraulic pressure cancel plate (6) is arranged to prohibit axial movement and its outside diameter edge is set oil-tightly on the inside surface of the second piston member (15). As the inside of this piston member (15) and the cancel plate (6) compose the centrifugal hydraulic pressure cancel chamber (9), though the structure is simple, the centrifugal hydraulic pressure is perfectly counter-balanced so that the operation of the actuators (3) and (12) at draining can be done smoothly. This gives reduction for the cost because the check ball is not needed to solve the problem of the centrifugal hydraulic pressure. Furthermore, between the second piston member (15) and the cancel plate (6) the spring (10) is arranged and the centrifugal hydraulic pressure cancel chamber (9) and the spring (10) work correspondingly to the first and the second piston members (7) and (15). Therefore, the first piston member (7) and the second piston member (15) can be moved by the spring (10) easily under the condition that the centrifugal hydraulic pressure is counter-balanced. As the cancel plate (6) is used as a receiving member to support the piston return spring, the centrifugal hydraulic cancel chamber (9), can be composed without increasing any members and without using much space in the axial direction.

In case that the clutch engaged by the first hydraulic actuator (3) is the first clutch (C1) connected from the first speed mode to the direct connecting driving mode and released at the over-drive driving mode, the high centrifugal hydraulic pressure caused by the high speed rotation at the time of, for example, up-shifting from forward third to the fourth speed mode at D range, in which the first hydraulic actuator (3) is operated, is perfectly counter-balanced by the high centrifugal hydraulic pressure of the centrifugal hydraulic cancel chamber (9) and the first clutch (C1) is released quickly, which makes shifting smooth.

What is claimed is:

1. A hydraulic device for an automatic transmission having first, second and third rotating members, forward first speed to direct transmission stages and a reverse transmission stage comprising:
    a clutch drum coaxially situated with respect to the first rotating member and having an inner surface,
    a first piston member situated inside the clutch drum and having an inner surface,
    a first hydraulic actuator formed between the inner surface of the clutch drum and the first piston member,
    a second piston member situated inside the first piston member,
    a second hydraulic actuator formed between the inner surface of the first piston member and the second piston member,
    a first clutch connected to the clutch drum, said first clutch engaging between the first rotating member and the second rotating member by means of the first hydraulic actuator while the automatic transmission is in the forward first speed to direct transmission stages, a second clutch connected to the first piston member, said second clutch engaging between the first rotating member and the third rotating member by means of the second hydraulic actuator while the automatic transmission is in the reverse transmission stage and the first clutch is in disengaging condition, one centrifugal hydraulic pressure cancel plate situated adjacent to the second hydraulic actuator, said cancel plate having an inner periphery attached to the first rotating member without axial movement thereto and an outer periphery slidably and sealingly situated inside the second piston, one centrifugal hydraulic pressure cancel chamber defined by the second piston member and the cancel plate, and a spring situated between the second piston member and the cancel plate, oil in the centrifugal hydraulic pressure cancel chamber and the spring operating against the first and second piston members to remove oil therefrom when the rotating members rotate at high speed.

2. A hydraulic device according to claim 1, wherein said first clutch is a forward clutch which engages from the forward first speed stage to direct transmission stage, and disengages at an over drive stage.

3. A hydraulic device according to claim 1, wherein said spring is a coil spring.

4. A hydraulic device according to claim 1, wherein said automatic transmission comprises a single planetary gear unit having a sun gear, a carrier and a ring gear, and a dual planetary gear unit having a sun gear, a carrier and a ring gear, said sun gears of the single and dual planetary gear units and said carriers of the single and dual planetary gear units being respectively integrally connected together, power from the first rotating member being selectively transmitted to one of the sun gear and the ring gear of the single planetary gear unit, and power transmitted to a desired transmission stage being taken out from the carrier.

5. A hydraulic device according to claim 4, wherein said second rotating member engaging the first rotating member through the first clutch is the ring gear of the single planetary gear unit.

6. A hydraulic device according to claim 4, wherein said third rotating member engaging the first rotating member through the second clutch is the sun gear.

7. A hydraulic device according to claim 4, wherein said automatic transmission further includes an input shaft, which is the first rotating member.

* * * * *